W. Oldman,

Steam-Boiler Fire-Tube.

No. 857 Reissued Nov. 22, 1859

Witnesses
W. H. Cutler
W. Crighton.

Inventor.
William Oldman

H. PETERS, PHOTO-LITHOGRAPHER, WASHINGTON, D. C.

UNITED STATES PATENT OFFICE.

WILLIAM OLDMAN, OF BUFFALO, NEW YORK.

IMPROVEMENT IN STEAM-BOILERS.

Specification forming part of Letters Patent No. 24,326, dated June 7, 1859; Reissue No. 857, dated November 22, 1859.

*To all whom it may concern:*

Be it known that I, WILLIAM OLDMAN, of the city of Buffalo, in the county of Erie and State of New York, have invented a new and useful Improvement in Steam-Boilers; and I do hereby declare that the following is a full, clear, and exact description of the same, reference being had to the accompanying drawings, forming part of this specification, in which—

Figure 1:
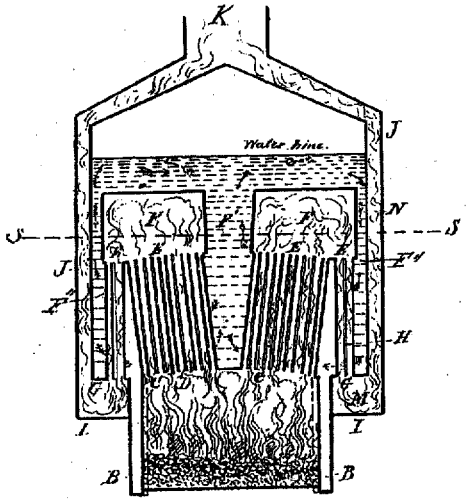
Figure 2:
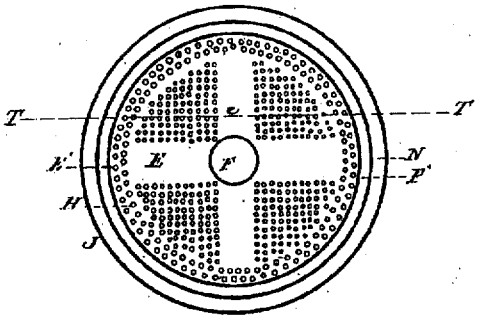
Figure 3:
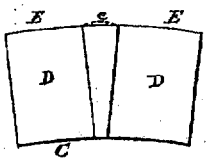

Figure 1 is a vertical section. Fig. 2 is a horizontal section.

The nature of my invention consists, first, in giving a dishing or partly-spherical form to the tube-sheets which receive and sustain each end of the tubes, the hollow or concave side of one tube-sheet being presented toward the swelled or convex side of the other, in order to allow more expansion and contraction to the tubes than is allowed by the use of plane tube-sheets; second, in a peculiar arrangement of the tubes in reference to each other and to the dishing or spherical tube-sheets, whereby the elasticity of the metal is made more available; third, in so arranging the tubes in sections as to make room for a man to pass between and around the sections to clear the sediment from the tubes, &c., and to inspect the interior condition of the boiler; fourth, in arranging the tubes relatively to the tube-sheets so that the tubes will pass through the tube-sheets at right angles to the concavo-convex surface of the tube-sheets; fifth, in terminating the return-tubes outside of the water-space which surrounds the furnace, and sufficiently above the bottom of the furnace to allow the sediment to be removed from the water-space, the tubes to be cleaned, and the ashes removed from the jacket, and also to allow the furnace to be repaired without interfering with the tubes.

My grate A is circular. An annular water-space or water-leg, W, completely encircles the fire, with the exception of an ordinary door on one side. (Not represented.) Across the top of the inside fire-box or furnace extends a crown-sheet or tube-sheet, C, which is not plane as are all ordinary tube-sheets, but is slightly arched or domed, the sheet being convex on its upper face and concave on its lower face, as represented. This sheet C is thickly perforated with holes, in which are secured the ends of the tubes D, so that the said tubes will stand at right angles to the concavo-convex surfaces of the tube sheets, through which tubes the products of combustion escape from the furnace. These tubes D are slightly inclined from the perpendicular, diverging as they ascend. I arrange them in three or more sections, as shown in Fig. 2, and dispose each tube in one section parallel to the other tubes in the same section. The upper extremities of these tubes are secured in a sheet, E, which is not plane, but, like C, is dishing or spherical, the convex side being presented upward. The sheet E, like the sheet C, is of a circular form. The sheet E is larger than the sheet C. By the divergence of the tubes D a larger sheet is required to secure them at their upper than at their lower extremities, and not only is the area of the curved portion greater, but, for obvious reasons, the radius of the curvature or "dish" of E is greater than that of C. The sheet E is of so large an area that it extends somewhat beyond the limits required to receive the ends of tubes D, but the annular portion E′ exterior to the tubes D is not dished; it is plane, like ordinary tube-sheets, as represented in Fig. 1. The divergence of the upper ends of the tubes D leaves a considerable space in the center, which, like the smaller interstices between the tubes, is allowed to be filled with water. Above the annular space in which the upper ends of D are secured is a spacious box or combustion-chamber, F, in an annular form, as represented. In this chamber the unburned gases rising from fresh fuel have a renewed opportunity to mingle with the free oxygen and flame and be burned. This combustion-chamber F is of such diameter that it extends over the plane annular portion E′ of the sheet E. The water-space standing in the center of the combustion-chamber (denoted F′) may be either cylindrical or conical. I have represented it as conical, the larger diameter uppermost. The combustion-chamber F may be of any height consistent with the height of the entire boiler, care being taken to have its top well stayed to the top of the boiler, and to be sure that there is always sufficient water in it to avoid danger of its overheating. The exterior or shell of the boiler is of larger diameter at the middle and top than at the base. At or near the level of C is an annular sheet, G, which connects the cylindrical portion of the shell of different diameters, as represented. This annular sheet is perforated, as is also the plane portion E′ of the sheet E, and in these perforations are tightly secured the ends of an additional series of tubes, H, as represented. Through these tubes H the hot gases are compelled to descend from the combustion-chamber F. Escaping from the lower ends of H, they impinge upon a horizontal plate, I, which surrounds the shell of the boiler at a lower level, as represented, and are then free to ascend to an annular space, N, provided between the shell of the boiler and a suitable jacket, J, and to escape through the stack K in the ordinary manner. This jacket may, if preferred, be double, and contain water between its parts, in order to heat such water, preparatory to its being forced into the boiler; but I have represented it as a simple jacket of thin metal. The top of the boiler and of the jacket may be of any form consistent with strength, either dome-like or spherical, conical, as represented, or of any other form according to the height allowable and as the desire to obtain dry steam may dictate.

It will be observed that the bottom of the jacket, as shown at I, the annular sheet G, and tube H are arranged sufficiently above the bottom of the furnace to allow room to remove the sediment which collects in the bottom of the water-space, and also to clear the tubes and allow the furnace to be repaired without interfering with the tubes or the jacket. Suitable doors are made through the jacket for this purpose. Also, by arranging the pipes D in sections and inclining them, as described, I make room for a man to pass between and around the sections, and clear the sediment from the tubes and sheets, and inspect the interior condition of the boiler.

The steam is taken from the boiler, at or near its top, in the usual manner, by a pipe (not represented;) and there are suitable manholes and hand-holes (not represented) through the boiler and through the jacket to allow access for repairs.

The hot gases arising from the fire ascend through the tubes D, imparting heat to the water surrounding and between them. Ascending from D slightly cooled, they mingle and complete their combustion in the chamber F, and thence descend, through the tubes H, to the annular smoke-box M, from which they rise in a current completley surrounding the boiler, imparting heat to the contents at every step, and escape comparatively cool into the stack K.

Plane tube-sheets, such as are commonly used, cannot be made perfectly plane, but, on the contrary are slightly undulating; consequently the expansion and contraction will be unequal, or in opposite directions, (up and down,) according to the slight undulations of the sheets, thereby loosening the connection with the tubes and causing leakage; but my improvement of making the tube-sheets in the concavo-convex form and arranging the tubes at right angles to the concavo-convex surfaces of the tube-sheets the tube-sheets and tubes will expand and contract in the same direction, and together, and therefore the difficulty is avoided, and a much more perfect boiler obtained.

I have ascertained by experience that this boiler is more efficient in generating steam than any other kind of similar size, and is much less troublesome to keep tight, (and it is more durable,) and requires less fuel.

Having now fully described my invention, what I claim as new therein, and desire to secure by Letters Patent, is—

1. The central water-space, F′, in the combustion-chamber F, arranged in relation to the annular water-space F″ and to the tubes D, or their respective equivalents, substantially as within set forth.

2. Placing the annular sheet G and horizontal plate I (which, with the jacket, form the smoke-box M) outside of the water-space W and sufficiently above the bottom of the water-space to allow the sediment to be conveniently removed from the water-space, in combination with the described arrangement of the return-tubes D, substantially as set forth.

WILLIAM OLDMAN.

Witnesses:
W. CRIGHTON,
E. B. FORBUSH.